April 2, 1957 E. L. CROSBY, JR 2,787,672

PUSH-PULL SERIES AMPLIFIER

Filed July 21, 1951

EDWARD L. CROSBY, JR.
*INVENTOR.*

*BY*

Killman and Kerst

United States Patent Office 2,787,672

Patented Apr. 2, 1957

2,787,672

PUSH-PULL SERIES AMPLIFIER

Edward L. Crosby, Jr., Baltimore, Md., assignor to Bendix Aviation Corporation, Towson, Md., a corporation of Delaware Application July 21, 1951, Serial No. 237,908

3 Claims. (Cl. 179—171)

This invention relates generally to series amplifiers and more particularly to a push-pull type amplifier having a series D. C. space current path.

This invention is related to the copending application of the present inventor entitled, "Amplifier System," Serial No. 135,275, filed December 27, 1949, and assigned to the same assignor as the instant application, now Patent No. 2,668,881, issued February 9, 1954. The present invention provides for operation of cascaded push-pull or balanced stages with the D. C. feed connections arranged to provide a serial D. C. path through the shunt combination of respective halves of the cascaded stages, thereby incorporating all of the advantages realized with the single ended circuits of the copending application as extended to push-pull circuit applications. In addition, the present invention provides further economies of operation and improved characteristics peculiar to a balanced signal translator employing high gain operation with series D. C. paths for the space current of adjacent stages.

It is, accordingly, an object of this invention to provide an improved push-pull type amplifier.

A further object is to provide a cascaded push-pull amplifier employing a minimum of parts and which is economical to manufacture.

Another object is to provide a balanced amplifier having improved interstage coupling arrangements.

Another object is to provide an improved wide band amplifier having no condensers in the circuit.

Figure 1:
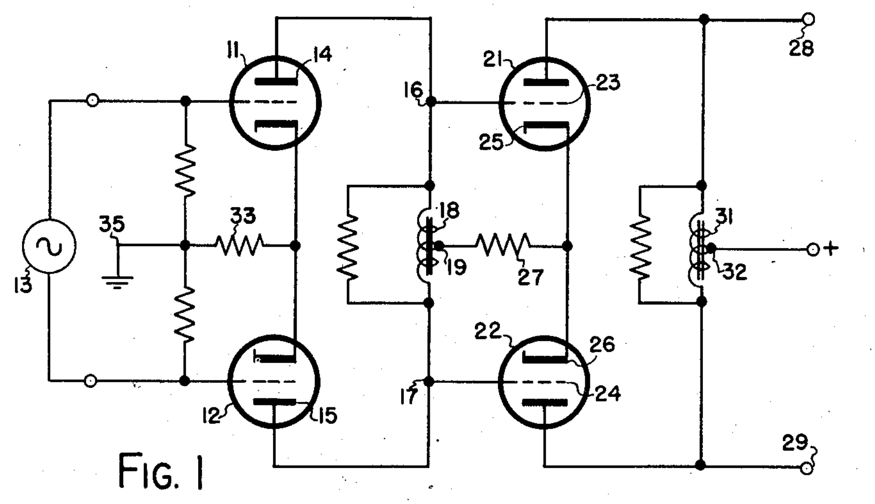
Figure 2:
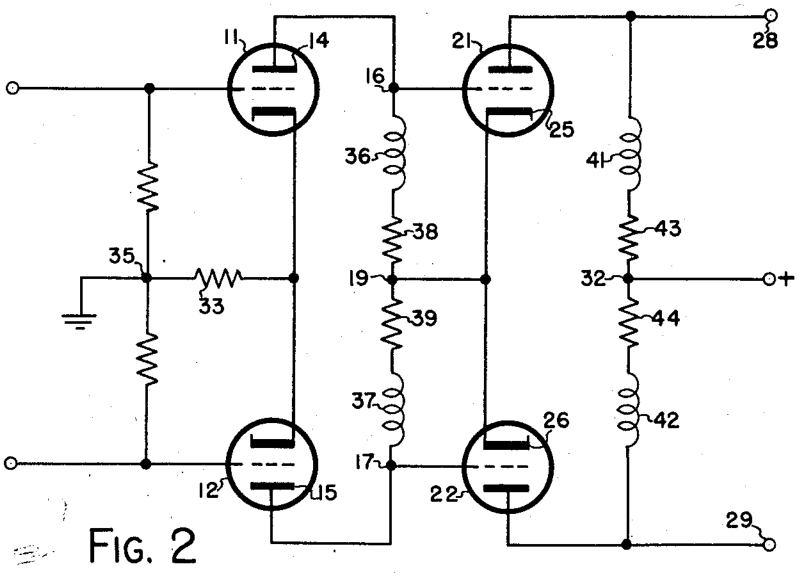

These and other objects of the present invention will be apparent from the following description and the accompanying drawing wherein:

Fig. 1 is a schematic diagram of the amplifier of the present invention in accordance with the present preferred embodiment thereof; and Fig. 2 is a schematic diagram of a modification.

The amplifier of Fig. 1 provides a pair of push-pull tubes 11 and 12 having their input circuits supplied in opposite phase from a source 13. The tubes 11 and 12 have their plates 14 and 15 connected to the end terminals 16—17 of a center-tapped impedance 18. Impedance 18 provides a D. C. path to the tubes 11 and 12 through the respective halves thereof from center-tap 19. The second push-pull stage including tubes 21 and 22 is driven at a high impedance level by the output of the tubes 14 and 15 by means of a direct connection from the plates 14 and 15 to grids 23 and 24. The tubes 21 and 22 have cathodes 25 and 26 connected together and joined to the tap 19 through a bias developing resistor 27, if desired. The output signal from the tubes 21 and 22 appears at terminals 28 and 29, being developed across a center-tapped impedance 31 in the plate circuit of the tubes 21 and 22. The impedances 18 and 31 are shown as simple inductors and may have iron cores as design requirements dictate. Other more complex two-terminal impedances may be employed provided only that a D. C. path exists therethrough.

The positive D. C. supply for the amplifier is connected to a tap 32 on impedance 31. The current path divides at tap 32 and proceeds through respective halves of the impedance 31 and through tubes 21 and 22 to the common junction of the cathodes 25 and 26. A single current path exists from the junction of cathodes 25 and 26 through resistor 27 to the tap 19. From the tap 19 the current path again divides and proceeds through respective halves of the impedance 18 and through tubes 11 and 12 to the common junction of the cathodes thereof. A single current path through a bias resistor 33 connected to ground 35 completes the circuit between the positive and negative D. C. supply terminals connected to the points 32 and 35, respectively.

Referring to Fig. 2, a modification of the present invention is shown which employs more generalized impedance elements individual to the plate circuits of the separate tubes. The plates 14 and 15 are connected through D. C. path impedance elements 36 and 37 and resistors 38 and 39 to the common center point 19. The cathodes 25 and 26 are directly connected to the common point 19. The plate circuits of tubes 21 and 22 are through impedances 41, 43 and 42, 44, respectively, to the common positive potential supply point 32. The supply current path between point 32 and ground 35 is the same as that described with reference to Fig. 1 with the current dividing at points 32 and 19 to flow through opposite halves of the push-pull circuit. In circuits according to the modification of Fig. 2 the bias for tube 21 is provided by the voltage drop in the plate resistance 38 of tube 14 and similarly for the other side of the circuit comprising tubes 22 and 12.

Circuits made in accordance with the teaching of the present invention provide superior amplifiers which are simple and reliable in operation and economical in manufacture. Operation of the circuit with respect to the signal amplification is similar to conventional push-pull amplifiers. The D. C. current operation is a series circuit for the stages employed with the amount of current in each half of a given stage depending on the instantaneous signal condition. The circuit of Fig. 1 is well adapted for low frequency applications, say below 500 kilocycles, but is not limited thereto and is useful in other applications such, for example, as in tuned band-pass amplifiers. The amplification characteristic thereof can be made uniform from the low frequency at which the inductive reactance of the impedances 18 and 31 falls off with respect to the shunt resistance component, up to a frequency at which the circuit stray capacitance decreases the gain. In this circuit the biases are developed across resistors 33 and 27 which need not be by-passed. The circuit of Fig. 2 is well adapted to use as a video amplifier of wide bandwidth with inductances 36 and 37 performing the function of conventional shunt peaking coils to improve the high frequency response. In this circuit the bias for tubes 21 and 22 is dynamic, being at all times equal to the plate load voltage drop of the corresponding tube of the preceding stage. This results in a desired condition for maximum utilization of inherent capabilities, namely, that the maximum voltage swing of the first stage is cut off for the second stage. For this circuit, then, the flat response extends down to D. C. and may be practically designed for an exceptionally high upper frequency response limit in the neighborhood of 20 megacycles.

Although the invention has been described in terms of circuits employing triodes, it is to be understood that multigrid tubes may be used, if desired, with the screen supplies being derived from the respective mid-points 19 and 32. Many other modifications of the teaching of the present invention will be apparent in the light of the above teachings in view of the well known modifications which are known in the art of amplifiers generally and other push-pull circuits in particular. By describing only the basic circuits as the preferred embodiments herein, it is not intended that the invention be limited thereto.

What is claimed is:

1. A push-pull amplifier having a driving stage and a driven stage comprising, signal coupling inductor means for coupling signals between the output circuit of said driving stage and the grids of said driven stage, and means for providing serial flow of space current through said driving and driven stages, said last named means including a conductive path between the cathodes of said driven stage to a junction on said signal coupling inductor means said conductive path including a resistor and said signal coupling inductor means providing a substantially resistanceless conductive path from the output electrodes of said driving stage to said junction, the portions of said coupling inductor means on opposite sides of said junction being mutually inductively coupled.

2. A push-pull amplifier having a driving stage and a driven stage and interstage coupling means therebetween comprising, conductive path connections from the output electrodes of said driving stage to the respective grids of said driven stage, a coupling inductor providing a substantially resistanceless conductive path common to the output electrode circuits of said driving stage and the grid input circuits of said driven stage and means including the conductive path of said inductor for providing serial flow of space current through said driving and driven stages, the last named means including a resistor common to the space current paths of the tubes of said driven stage.

3. A push-pull amplifier having a driving stage, a driven stage and interstage coupling means therebetween comprising, conductive path connections from the ouput electrodes of said driving stage to the respective grids of said driven stage, an inductor of low resistance connected between the output electrodes of said driving stage, conductive path connections joining the cathodes of said driven stage to a point on said inductor intermediate the ends thereof, the last named connections having a common portion including a resistor, and means including said joining connections and said inductor for providing serial flow of space current through said driving and driven stages.

References Cited in the file of this patent

UNITED STATES PATENTS

| | | |
|---|---|---|
| 1,833,968 | Holden | Dec. 1, 1931 |
| 2,211,914 | Soller | Aug. 20, 1940 |
| 2,289,091 | Bell | July 7, 1942 |
| 2,424,893 | Mansford | July 29, 1947 |
| 2,446,025 | Rockwell | July 27, 1948 |
| 2,545,507 | Williams | Mar. 20, 1951 |
| 2,554,279 | Tharp | May 22, 1951 |